UNITED STATES PATENT OFFICE.

WILLY LOEBELL, OF KLEIN-ZSCHACHWITZ, NEAR DRESDEN, GERMANY.

PROCESS OF PURIFYING VISCIN.

No. 800,925.     Specification of Letters Patent.     Patented Oct. 3, 1905.

Application filed December 29, 1904. Serial No. 238,854.

*To all whom it may concern:*

Be it known that I, WILLY LOEBELL, a subject of the German Emperor, residing at Klein-Zschachwitz, near Dresden, in the Kingdom of Saxony and Empire of Germany, have invented certain new and useful Improvements in Processes of Purifying Crude Viscin from Plants of the Ilex Class, of which the following is a specification.

My invention relates to a new and improved process for purifying viscin obtained from plants of the Ilex type. Viscin from these plants has for some years been imported from Japan. It is a viscous, tough, elastic, gum-like substance having a decidedly disagreeable odor. The crude viscin contains, among other things, two very detrimental impurities—namely, water and bark. The water, of which pure viscin sometimes contains as much as fifty per cent., causes fermentation, as does also the bark, and in consequence there is imparted to the mass acetic-acid products of fermentation. These products are the cause of the disagreeable odor. Obviously, it is very necessary to remove this water, bark, &c., so as to obtain a pure, wholesome, and agreeable product. In my process I obtain a pure, wholesome, and agreeable product of viscin.

The process consists, preferably, of the following steps: I first knead the crude viscin with calcium carbonate, ($CaCO_3$.) This combines with the acetic acid ($HC_2H_3O_2$) products present, the amount of calcium carbonate depending upon the amount of acetic acid present, the point being to use enough calcium carbonate to combine with all the $HC_2H_3O_2$ products present. Carbon dioxid ($CO_2$) is set free during this step and percolates through the mass, tending to thoroughly loosen it. After this action has ceased I treat the resulting product with a dehydrating substance, such as burnt powdered gypsum, ($CaSO_4$,) the amount of dehydrating substance being directly proportional to the amount of water present. After removal of all the water the resulting product is treated in an extractor with benzin. The excess of $CaCO_3$, $CaSO_4$, sand, bark, &c., remaining, the viscin only dissolving. A greenish extract containing benzin results. This extract is then distilled off in the ordinary manner and with the ordinary apparatus, whereupon a thick clear mass of pure viscin results. The viscin as obtained can be mixed with oil—for instance, with oil of mustard. When an oil product is wanted, however, the above process can be varied. The crude viscin is mixed and kneaded with $CaCO_3$ and burnt $CaSO_4$. This is extracted by means of the oil solution desired. The removal of the water is of great importance, since its presence would seriously affect the power of the solvents. The addition of calcium carbonate and calcium sulfate makes the tough viscous viscin a granular substance easily worked.

Having now fully described my invention, what I claim, and desire to secure by Letters Patent, is—

1. The herein-described process which consists in the addition to crude viscin of a neutralizer, in subjecting the mixture to the action of a dehydrator, and in extracting the viscin by a solvent.

2. The herein-described process which consists in the addition to crude viscin of a neutralizer, in subjecting the mixture to the action of a dehydrator, in extracting the viscin by a solvent, and in subsequently distilling off the solvent.

3. The herein-described process which consists in kneading the crude viscin with calcium carbonate and in the addition to the mixture of burnt gypsum, in subsequently extracting the viscin by means of benzin, and in distilling off the same.

In testimony whereof I affix my signature in presence of two witnesses.

WILLY LOEBELL.

Witnesses:
   MORRIS LIPMAN,
   FREDERICK J. SIETZMEN.